(12) United States Patent
Barrett

(10) Patent No.: US 6,616,407 B2
(45) Date of Patent: Sep. 9, 2003

(54) GAS TURBINE ENGINE GUIDE VANE

(75) Inventor: David W Barrett, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 10/078,672

(22) Filed: Feb. 21, 2002

(65) Prior Publication Data

US 2002/0127095 A1 Sep. 12, 2002

(30) Foreign Application Priority Data

Mar. 9, 2001 (GB) ................................. 0105814

(51) Int. Cl.$^7$ ................................. F01D 5/18
(52) U.S. Cl. ................................. 416/97 R
(58) Field of Search ................... 415/115; 416/95, 416/96 A, 96 R, 90 R, 97 R

(56) References Cited

U.S. PATENT DOCUMENTS

| | | | |
|---|---|---|---|
| 5,288,207 A | | 2/1994 | Linask |
| 5,462,405 A | * | 10/1995 | Hoff et al. ................. 416/97 R |
| 5,772,397 A | * | 6/1998 | Morris et al. ................ 415/115 |

* cited by examiner

*Primary Examiner*—Edward K. Look
*Assistant Examiner*—Dwayne J. White
(74) *Attorney, Agent, or Firm*—W. Warren Taltavull; Manelli Denison & Selter PLLC

(57) ABSTRACT

An air cooled guide vane (20) is provided with a stack of ducts (40) each of which converges towards its outlet end. Air flow turbulators (42) are positioned in ducts (40) and pressure losses in the air flow brought about by flowing over the turbulators (42), is recovered by the constricting effect of the ducts (40).

6 Claims, 2 Drawing Sheets

GAS TURBINE ENGINE GUIDE VANE

The present invention relates to guide vanes of the kind used in gas turbine engines. The invention has particular efficacy in use in gas turbine engines of the kind that power aircraft, but should not be considered as being restricted to such use. Rather, the invention has efficacy in any gas turbine engine including those for use in marine and industrial applications.

Specifically, the present invention relates to a hollow, gas turbine engine air cooled guide vane that includes features that enhance the performance of a guide vane in a hot environment, when a flow of cooling air passes therethrough.

Known performance enhancing features comprise protuberances on the inner surfaces of the aerofoil portion of the vane, some or all of which span the space bounded by those inner wall surfaces. The protuberances generate turbulence in the air flowing over them, so as to slow its speed, and thus cause it to spend more time on the inner surfaces of the guide vane. More heat is thereby extracted from the aerofoil and protuberances, prior to the air leaving the guide vane interior, via an elongate slot in its trailing edge.

The performance enhancing features described hereinbefore, whilst including the stated benefits, also have drawbacks, in that slowing the air flow causes a pressure drop therein. This results in a need for a relatively high cooling air flow from a compressor of the associated engine, which in turn, reduces the amount of air available to burn in the engine combustion system. Moreover, the air leaves the trailing edge of the guide vane at a velocity considerably slower than that of the gas stream flowing over the exterior of the guide vane, and when the two flows meet, interference occurs.

The present invention seeks to provide an improved cooled gas turbine engine guide vane.

According to the present invention a gas turbine engine guide vane comprises a hollow aerofoil containing a stack of cooling air flow ducts aligned chordally of the aerofoil and defined in part by the inner wall surfaces of said aerofoil, and in part by webs which span the space between said inner wall surfaces, said webs being shaped so that their facing surfaces converge in a direction towards the trailing edge of said aerofoil.

The invention will now be described, by way of example, and with reference to the accompanying drawings, in which.

Figure 1:
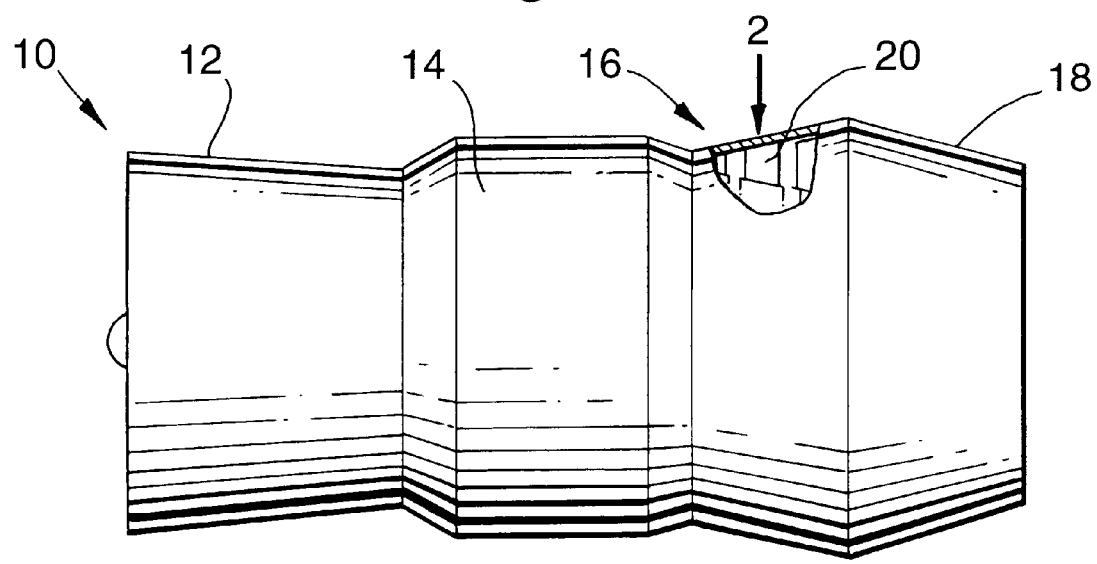
FIG. 1 is a diagrammatic view of a gas turbine engine incorporating a guide vane in accordance with the present invention.

Referring to FIG. 1. A gas turbine engine 10 has a compressor 12, combustion system 14, turbine section 16, and an exhaust duct 18.

Figure 2:
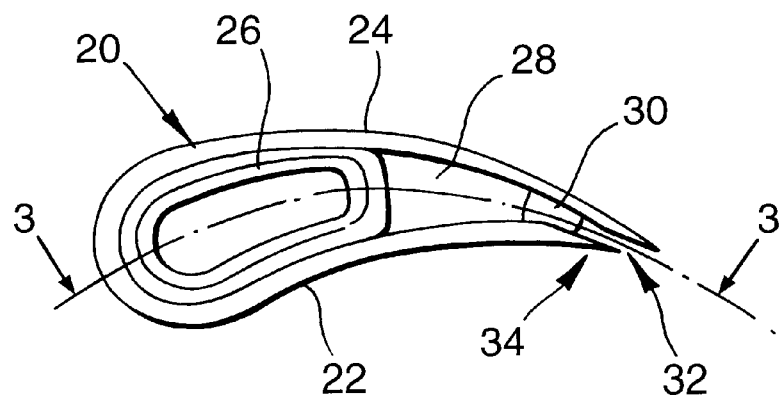
FIG. 2 is a view in the direction of arrow 2 in FIG. 1.

Turbine section 16 includes a stage of guide vanes 20, the function of which is well known, and will not be described herein. However, the guide vanes 20 do incorporate in the present invention, as is described hereinafter, in the first instance with reference to FIG. 2. Each guide vane 20 is of aerofoil shape, and has walls which have a respective pressure surface 22 and suction surface 24. Vane 20 is hollow and contains a perforated tube 26, which extends through the greater portion thereof, as is more clearly seen in FIG. 3. Each vane 20 also contains a stack of webs 28, which span the interior space defined by the side walls of vane 20. Further webs 30 span a slot 32 which extends for the full length of the trailing edge 34 of vane 20, and their sole function is to support the thin trailing edge 34 against deformation under gas loads.

Figure 3:
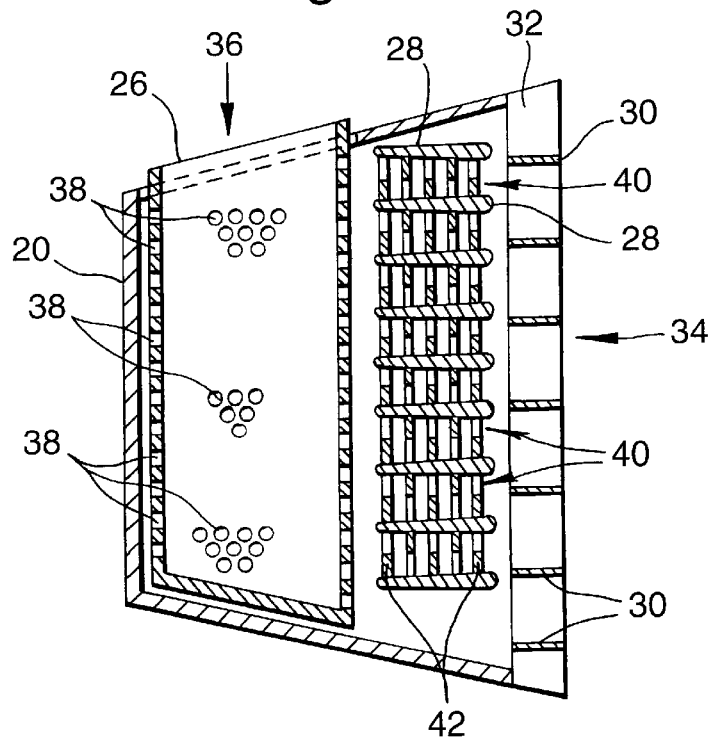
FIG. 3 is a view on the vane chordal line 3—3 in FIG. 2.
Figure 4:
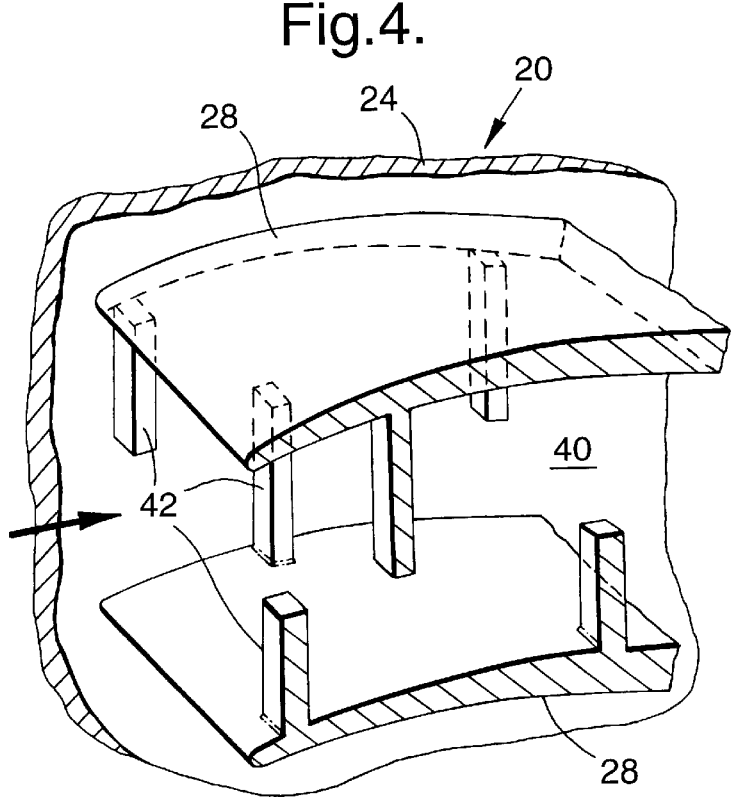
FIG. 4 is a pictorial part view of FIG. 3.

Referring now to FIG. 3 tube 26 is perforated in known manner, and during operation of vane 20 in an associated gas turbine engine 10, compressor air is delivered to the interior of tube 26, via its upper end 36. The air then bleeds through the perforations 38, only a few of which are shown, into the interior of vane 20, so as to cool the inner surfaces thereof. The cooling air then flows in a downstream direction, with respect to the direction of gas flow through the associated engine 10, to enter a stack of ducts 40, the cross sectional shapes and areas of which are defined by the inner surfaces of the side walls of vane 20, and the facing surfaces of adjacent pairs of webs 28.

The mean centrelines of webs 28 are parallel with each other. Their surfaces however diverge from their respective centrelines in the said downstream direction so that their downstream ends thicken. Ducts 40 are thus convergent ducts n the plane of FIG. 3, as well as in the plane of FIG. 2, wherein the convergent form is defined by the narrowing of vane 20 towards its trailing edge.

Referring to FIG. 3 in the present example, protuberances 42 of a particular shape are provided in each duct 40 i.e. the protuberances 42 are elongate and rectangular in cross section. The protuberances 42 are arranged in alternating manner, both in the direction of air flow and transversely thereto. Their function is to generate turbulence in the cooling air as it flows over them, after leaving tube 26, thus enabling the extraction of more heat from the side walls of vane 20. However, the converging ducts 40 in which the turbulence occurs, serve to increase the speed of the air flow prior to leaving them, to a level greater than has been attained in prior art examples, which in turn enhances heat extraction and reduces the pressure losses when mixed with the main stream gas, relative to the losses experienced in the said prior art.

The present invention offers the following advantages over known prior art:

a) A reduced pressure loss in the cooling air flow for higher levels of heat extraction in the said prior art, which provides a choice of either exposing the vane 20 to higher temperatures without damage, or reducing the air flow from the compressor and exposing the vane 20 to the original temperatures, which provides more air for combustion.

b) The increased surface area of webs 28 keep the air in contact therewith, for longer than is possible with the protuberances of the known prior art, and thus enable more heat extraction from the walls of vane 20.

c) Ducts 40 ensure that the air flow enters the gas stream in parallel therewith, thus avoiding interference.

d) Ducts 40 provide mechanical stiffness/strength to the vane 20 walls.

The expert in the field, having read this specification, will appreciate that experiments with the shape, number and position of the protuberances within ducts 40, and the magnitude of convergence of each duct 40, will enable achievement of efficient cooling air pressure, with use of minimum air usage, along with maximum heat extraction, in gas turbine engines, whatever their power rating. One such experiment (not shown) could comprise adding further turbulators 42 upstream of, and in alignment with ducts 40. Air leaving the further turbulators would enter ducts 40 and be re-pressurised.

I claim:

1. A gas turbine engine guide vane comprising a hollow aerofoil having inner wall surfaces and a trailing edge containing a stack of cooling air flow ducts aligned chordally of the aerofoil and defined in part by said inner wall surfaces of said aerofoil, and in part by webs which span the space between said inner wall surfaces, said webs being shaped so that their facing surfaces converge in a direction towards the trailing edge of said aerofoil.

2. A gas turbine engine guide vane as claimed in claim 1 wherein air flow turbulence generating means are provided therewithin, some of which are external to, but aligned with said ducts, upstream thereof, the remainder being in said ducts.

3. A gas turbine engine guide vane as claimed in claim 1 wherein air flow turbulence generating means are provided in said ducts.

4. A gas turbine engine guide vane as claimed in claim 3 wherein said turbulence generating means comprises elongate protuberances.

5. A gas turbine engine guide vane as claimed in claim 4 wherein said protuberances are positioned in said ducts with their major dimensions normal to the vane chordal plane.

6. A gas turbine engine guide vane as claimed in claim 4 wherein said protuberances are rectangular in planes normal to their major dimensions.

* * * * *